United States Patent [19]

Igarashi et al.

[11] Patent Number: 5,024,261
[45] Date of Patent: Jun. 18, 1991

[54] HEAVY DUTY PNEUMATIC RADIAL TIRE WITH IMPROVED STEEL CORD BELT

[75] Inventors: Eiji Igarashi; Susumu Imamiya; Yasuo Suzuki, all of Hiratsuka, Japan

[73] Assignee: The Yokohama Rubber Co., Ltd., Tokyo, Japan

[21] Appl. No.: 430,026

[22] Filed: Nov. 1, 1989

Related U.S. Application Data

[63] Continuation-in-part of Ser. No. 124,204, Nov. 23, 1987, abandoned.

[30] Foreign Application Priority Data

Nov. 25, 1986 [JP] Japan ................... 61-278805

[51] Int. Cl.$^5$ ............ B60C 9/18; B60C 9/20; B60C 9/00
[52] U.S. Cl. ................... 152/527; 152/451; 57/902
[58] Field of Search .......... 152/451, 556, 527; 57/902

[56] References Cited

U.S. PATENT DOCUMENTS

| | | | |
|---|---|---|---|
| 3,996,733 | 12/1976 | Holmes | 57/902 X |
| 4,020,887 | 5/1977 | Vlasov et al. | 152/451 |
| 4,349,063 | 9/1982 | Kikuchi et al. | 152/451 |
| 4,518,024 | 5/1985 | Matsunuma | 152/361 |
| 4,520,857 | 6/1985 | Ogino et al. | 152/527 |
| 4,609,024 | 9/1986 | Yatsunami et al. | 152/527 |
| 4,690,191 | 9/1987 | Kawasaki | 152/527 |
| 4,715,419 | 12/1987 | Kawasaki et al. | 152/527 |

FOREIGN PATENT DOCUMENTS

| | | |
|---|---|---|
| 3442799 | 6/1985 | Fed. Rep. of Germany |
| 2039580 | 8/1980 | United Kingdom ............... 152/451 |

OTHER PUBLICATIONS

*Mechanics of Pneumatic Tires,* ed. Samuel Clark: U.S. Dept. of Transportation, Aug. 1981, p. 131.
Peene, G., "Dan Verhalten von Stahlcord unter Verschiedenen Beanspruchungen." *Kautschuk und Gummi Kunststoffe,* vol. 26, No. 7 (Jul. 1973), pp. 311–317.

*Primary Examiner*—Michael W. Ball
*Assistant Examiner*—Adrienne C. Johnstone
*Attorney, Agent, or Firm*—Armstrong, Nikaido, Marmelstein, Kubovcik & Murray

[57] ABSTRACT

A heavy duty pneumatic radial tire including between a tread and at least one carcass layer, at least two belt layers, wherein an outermost belt layer disposed most closely to the tread out of all belt layers comprises a steel cord which has a cord structure of 2+7 made of an element wire having a carbon content of 0.77 to 0.92% by weight and a diameter d of 0.28 to 0.40 mm and which has a tenacity at break of $(1700 \sim 2050)d^{1.872}$ (kgf/cord) and a ratio of an elongation at break $\epsilon$ to P.L.E., $\epsilon$/P.L.E., of at least 30, and a coat rubber having a 50% modulus of 10 to 40 kg/cm$^2$, and wherein the outermost belt layer has a thickness of at least 1.67 times the minor diameter but at greatest 1.79 times the major diameter, of the steel cord.

4 Claims, 2 Drawing Sheets

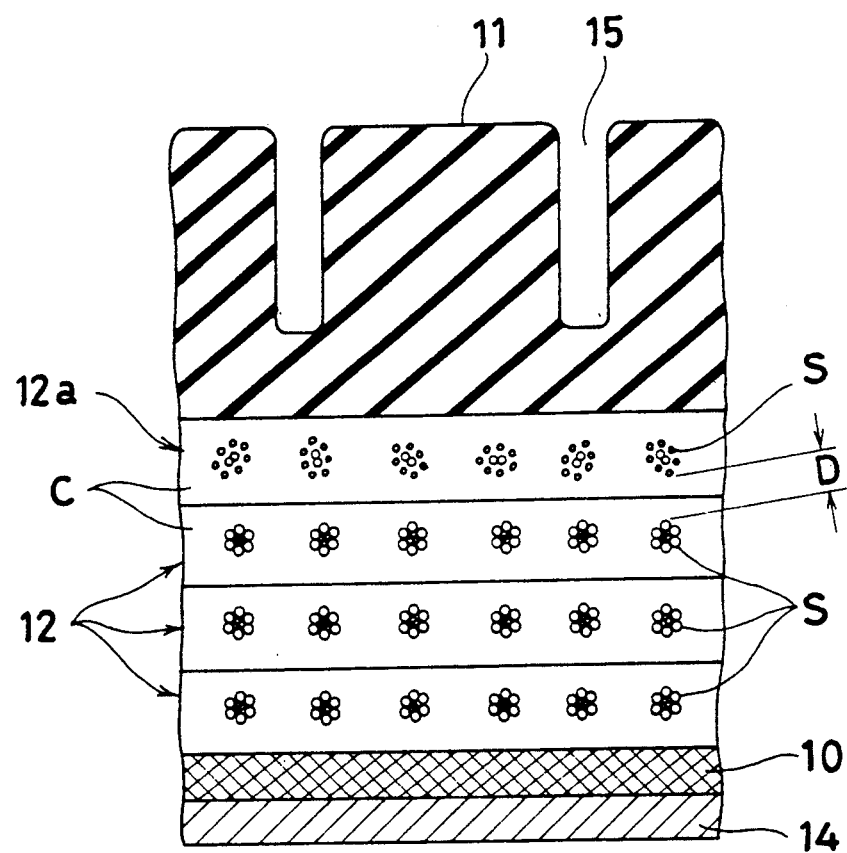

HEAVY DUTY PNEUMATIC RADIAL TIRE WITH IMPROVED STEEL CORD BELT

This application is a continuation-in-part application of application Ser. No. 124,204, filed Nov. 23, 1987.

BACKGROUND OF THE INVENTION

The present invention relates to a heavy duty pneumatic radial tire and, more particularly, a heavy duty pneumatic radial tire improved in or relating to the impact resistance and the durability without the weight of the tire increased and without a sacrifice caused to the steering stability.

Generally, in heavy duty pneumatic radial tires (hereinafter referred to simply as heavy duty tires), their tread portion is reinfoced with at least two belt layers comprising steel cords.

Such heavy duty tires of which the tread portion is reinforced with belt layers comprising steel cords as above have a remarkable steering stability and, in addition, have remarkable tire performance characteristics such as a high abrasion resistance and a low fuel consumption characteristic. However, steel cords have an essential shortcoming that when subjected to contact with water, they undergo rusting and corrosion, and a problem is indicated that when water is permitted to enter for example a cut damage in the tread portion and reach the belt layer, it tends to occur that the water permeates into the interior of the steel cords in the belt layer and cause them to corrode, resulting in that the adhesion between the steel cords and a coat rubber becomes deteriorated to generate a separation of the tread and the belt layer from each other.

To give solution to the above problem, the U.S. Pat. No. 4,715,419 (Kawasaki et al) proposes to provide a heavy duty tire by using an element wire shaped prior to a cord formation to provide a highly extensible steel cord preferably of 2+7 or 2+6 construction and having an increment of an initial elongation (P.L.E.) of 0.3 to 1.5% when a load is increased from 0.25 kg to 5 kg and an elongation at break of 3.0 to 5.5%, and then by utilizing the above obtained steel cord in an outermost belt layer. The above steel cord permits an easy permeation of a coat rubber into its interior, so that it can exhibit a remarkable corrosion resistance. However, the P.L.E. of the cord is so large that the strength bearing ratio of the outermost belt layer is extremely limited, so that this belt layer cannot exhibit a satisfactory reinforcing function, and also the rigidity of the outermost belt layer incorporating this steel cord tends to be lowered, whereby the steering stability of the tire is lowered.

Then, as proposed in the above referred-to U.S. Pat. No. 4,715.419 for example, conventionally it has been generally practiced to use a relatively thick or bold steel cord in an inner belt layer to thereby make up for the insufficiency in the strength or the rigidity. However, this measure is not advantageous in that the weight of the tire is then increased, indispensably. That is to say, conventionally made attempts to improve the impact resistance and the durability of tires are generally such as to increase the P.L.E. of the steel cords for use in or for the outermost belt layer and thereby let escape the strain that the tire will receive. However, by increasing the P.L.E. of the steel cords for the outermost belt layer as above, the strength bearing ratio of the outmost belt layer becomes lowered, and because of this, it becomes indispensable to increase the diameter of the element wire for the steel cord for an inner belt layer in order to compensate for the lowering of the strength bearing ratio of the outermost belt layer so as to increase the strength at break. As a result of this, an increase in the weight of the tire is unavoidable.

BRIEF SUMMARY OF THE INVENTION

A primary object of the present invention is to provide a heavy duty pneumatic tire improved in or relating to the impact resistance, the durability and the steering stability, the improvement being made without increasing the weight of the tire, by effectively suppressing the P.L.E. of a steel cord and improving the strength bearing ratio of the steel cord, without impairing the desirable characteristic of steel cords of 2+7 construction that the cords permit an easy permeation of a coat rubber, and thereby improving the toughness of the steel cord by improving the tenacity at break and the elongation at break and avoiding a lowering of the rigidity.

Such object of the invention is attained according to the present invention by providing a heavy duty radial tire which is of the structure having at least two belt layers comprising steel cords, including at least a pair of belt layers with steel cords in one belt layer crossing those in the other belt layer, interposed between a tread and at least one carcass layer having carcass cords arranged substantially at right angles to the circumferential direction of the tire, and in which an outermost belt layer disposed most closely to the tread is composed of a steel cord of 2+7 structure made of an element wire having a carbon content of 0.77 to 0.92% by weight and a diameter d of 0.28 to 0.40 mm, said cord having a tenacity at break of $(1700 \sim 2050)d^{1.872}$ (kgf/cord), a ratio of an elongation at break $\epsilon$ to a P.L.E., $\epsilon$/P.L.E., of at least 30, and a coat rubber having a 50% modulus of 10 to 40 kg/cm$^2$, the outermost belt layer having a thickness of at least 1.67 times the minor diameter but at greatest 1.79 times the major diameter, of the steel cord in the outermost belt layer.

Further, in or for the present invention, the P.L.E. means the increment of the elongation defined by P.L.E. (%)=$l_2-l_1$, in which $l_1$ is the ratio (%) of elongation of the steel cord at a load of 0.25 kg and $l_2$ is the ratio (%) of elongation of the steel cord at a load of 5 kg.

BRIEF DESCRIPTION OF THE DRAWINGS

FIG. 3 is a sectional partial view, showing a tread portion in the tires according to the invention.

DETAILED DESCRIPTION OF THE PREFERRED EMBODIMENTS

Figure 1:
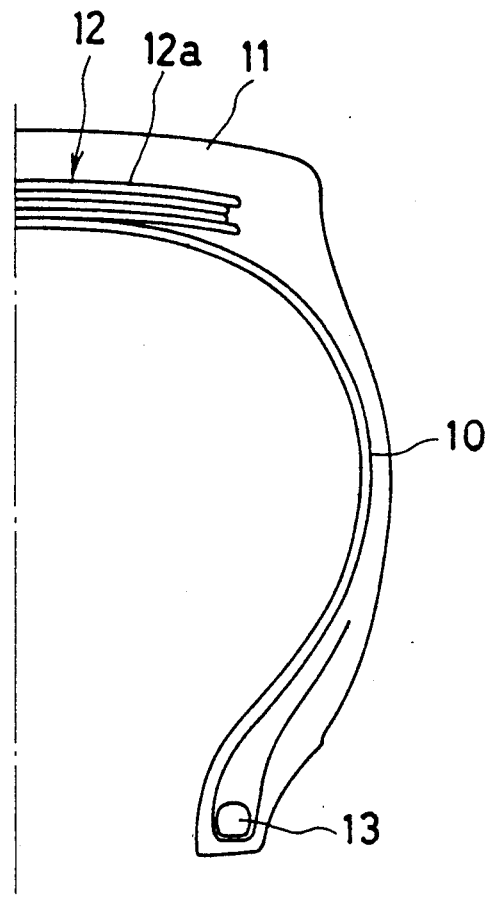
FIG. 1 is a sectional half view, showing an example of heavy duty pneumatic radial tires according to the present invention.

As shown in FIG. 1, the tire according to the invention comprises a pair of bead cores 13, one on the left-side and the other on the right-side of the tire, at least one carcass layer 10 comprising steel cords, having a cord angle of substantially 90 degrees to the circumferential direction of the tire and having respective end portions turned up around respective bead cores 13 from the inner side to the outer side of the tire, and at least two belt layers 12 comprising steel cords and disposed in the portion of a tread 11 on top of the carcass layer 10. In at least a pair of belt layers which are disposed adjacent to each other, among the two or more belt layers 12, steel cords are arranged in a crossing relationship such that cords in one belt layer cross those of the other belt layer, and preferably the number of the belt layers is four as shown in FIG. 1 or more.

As shown in FIG. 3, in the portion of the tread 11 the above radial tire has an inner liner layer 14 disposed inner to the carcass layer 10, and external to the carcass layer 10, the four belt layers 12 composed of steel cords S and a coat rubber C are disposed. On top of the belt layers 12, the tread 11 is provided.

Figure 2:
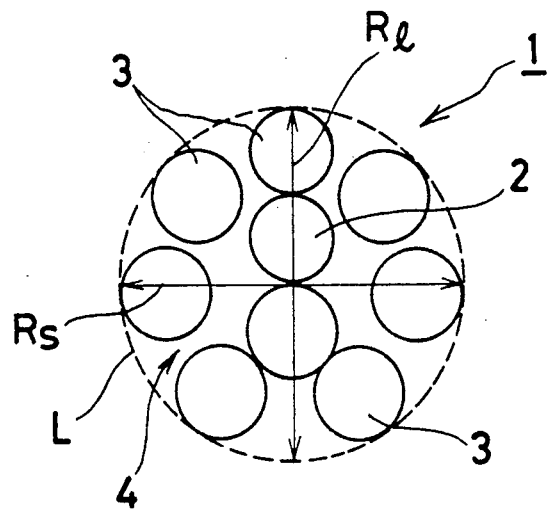
FIG. 2 is a sectional view, showing an example of steel cords for use in the outermost belt layer in the tires according to the invention.

Among the plurality of belt layers 12, the outermost belt layer 12a disposed most closely to the tread 11 comprises steel cords having 2+7 cord structure in which, as shown in FIG. 2, seven element wires 3 are so arranged as to externally surround two element wires 2. The cross section of the steel cord surrounded by an outer contour line L has an elliptical shape having a major axis Rl and a minor axis Rs, and steel cords having a ratio of the major axis Rl to the minor axis Rs, Rl/Rs, within a range of 1.1 to 1.4 are used in or for the present invention. Steel cords in other belt layers 12 than the outermost belt layer 12a are not always required to be of the 2+7 cord structure and in the illustrated embodiment of the invention, use is made of steel cords of a 3+6 structure.

As shown in FIG. 2, the steel cords S used in the outermost belt layer 12a include gaps 4 between adjacent outer element wires 3 and 3, so that the coat rubber can easily permeate into the interior of the cord through the gaps 4, so that not only the periphery of the outer element wires 3 but also that of the inner element wires 2 can be completely covered with the coat rubber, whereby it is possible to impart a remarkable corrosion resistance to the steel cords.

The above steel cords having 2+7 cord structure should necessarily have a tenacity at break of $(1700 \sim 2050)d^{1.872}$ (kgf/cord) and a ratio of an elongation at break $\epsilon$ to P.L.E., $\epsilon$/P.L.E., of at least 30 depending on the diameter d of the element wires. Preferably, the above ratio $\epsilon$/P.L.E. is from 35 to 80.

Generally, the elongation at break $\epsilon$ and P.L.E. have a correlation, and as the elongation at break $\epsilon$ is larger, so is the P.L.E. or, on the contrary, as the P.L.E. is smaller, so is the elongation at break $\epsilon$. Values of the elongation at break $\epsilon$ and the P.L.E. are determinable based on the pitch of twist and the shaping ratio of the steel cords. In the steel cord of the 2+7 structure according to the invention, when the above ratio $\epsilon$/P.L.E. does not reach 30, either the P.L.E. is relatively large or the elongation at break $\epsilon$ is relatively small. As the P.L.E. is greater, the strength bearing ratio of the outermost belt layer lowers, so that this belt layer cannot exhibit a sufficient reinforcing function, and the rigidity of this belt layer lowers to lower the steering stability. On the other hand, as the elongation at break $\epsilon$ is smaller, the toughness of the steel cord lowers and the outermost belt layer cannot exhibit a sufficiently great impact resistance. Although the above ratio $\epsilon$/P.L.E. should desirably be as large as possible, in practice a limitation is applied to the P.L.E. of steel cords, so that the ratio $\epsilon$/P.L.E. is 80 at greatest.

According to the present invention, the tenacity at at break of steel cords is set at such a very high level as to be $(1700 \sim 2500)d^{1.872}$ (kgf/cord) depending on the diameter d of the element wire, and thereby the cord can have a considerably high toughness. The toughness of steel cords can be increased to a certain extent also simply by way of increasing the diameter of the element wire and increasing the strength thereof, but in this case, it is unavoidable to cause the weight of the tire to increase.

The steel cord according to the invention has a large or high value in respect of not only the strength at break but also the above described ratio $\epsilon$/P.L.E., so that according to the invention it is possible to remarkably improve the impact resistance of the outermost belt layer.

To meet the above required characteristics, it is necessary to use such an element wire for the steel cord of 2+7 structure which has a carbon content of 0.77 to 0.92% by weight and a diameter d of 0.28 to 0.40 mm. Using an element wire having a carbon content not reaching 0.77% by weight, a steel cord satisfying $(1700 \sim 2050)d^{1.872}$ (kgf/cord) cannot be obtained. Also, with element wires the carbon content of which exceeds 0.92% by weight, they do not have a desirable processability for drawing, and using such wire, it is difficult to industrially manufacture a steel cord having a high tenacity as required according to the present invention. Further, using an element wire the diameter d of which is smaller than 0.28 mm, it is impossible to obtain a toughness which is so high that a heavy duty tire does not undergo a break in case it is subjected to an abrupt shock application. On the other hand, if element wires have a diameter d greater than 0.40 mm, they no longer have a sufficient drawing processability, and using such element wires, it is impossible to obtain a steel cord having a high bending strength and being capable of improving the tire durability.

In order to obtain a steel cord for use for the present invention having a ratio $\epsilon$/P.L.E. within the above preferred range, it is preferable to set twist pitches such that for example in the case of an element wire having a diameter of 0.30 mm, the twist pitch of the inner element wires is 5 to 10 mm and that of the outer element wires is 10 to 20 mm. In case of smaller twist pitches than the above preferred ranges, the P.L.E. value becomes excessively great and, in addition, the weight per unit length of the steel cord increases excessively. On the contrary, if the twist pitches exceed the above preferred ranges, the elongation at break becomes excessively small and the ease of rubber to permeate is lowered, so that rustproof characteristic becomes lowered.

In providing the outermost belt layer using the above described steel cord according to the present invention, it is necessary to coat the cord with a coat rubber having a 50% modulus within a range of 10 to 40 kg/cm². Using a coat rubber having a 50% modulus not reaching 10 kg/cm², generation of strain at ends of the outermost belt layer tends to increase and a separation tends to easily occur at belt edges to adversely affect the durability. Then, in case the 50% modulus of rubber exceeds 40 kg/cm², steel cords tend to undergo buckling when a compression force acts in the outermost belt layer during service of the tire, and since the steel cords are prone to bending, the durability of the tire lowers.

According to the present invention, it is further required to meet that the outermost belt layer has a thickness at least 1.67 times the minor diameter Rs but at greatest 1.79 times the major diameter Rl, of the steel cords used in this belt layer. In case the thickness of the outermost belt layer does not reach 1.67 times the minor diameter Rs of the steel cords, the distance D between a steel cord S embedded in coat rubber C in the outermost belt layer 12a and a steel cord S embedded in coat rubber C in an inner belt layer 12 immediately adjacent the outermost belt layer (FIG. 3) becomes so small that the function of the outermost belt layer to protect the inner belt layer lowers, whereby the durability of the tire becomes lowered. On the contrary, when the outermost belt layer is made having a thickness exceeding 1.79 times the major diameter Rl of the steel cords, the rigidity of the outermost belt layer lowers and the steering stability is impaired.

Regarding the inner belt layers, no particular limitation is applicable to them, and any of belt layers useful as an inner layer in or for heavy duty tires may be appropriately utilized. It is also possible to use a same belt layer as the above described outermost belt layer for the inner belt layers.

Further, to increase the adhesion of the steel cords to the coat rubber, the steel cords for use in or for the present invention may be made of an element wire the surface of which is plated with any of metals such as Cu, Sn and Zn with or without containing Ni or Co and alloys of at least two of Cu, Sn and Zn with or without containing Ni or Co.

Now, the present invention will be described in greater detail in connection with examples of the present invention, comparative examples and prior art examples.

There were produced 11 different steel cords having respective carbon contents in element wires and diameters of element wires, cord structures, twist pitches, tenacity at break values, elongation at break values and P.L.E. values as shown in the below Table 1. For each of the element wires, a Cu/Zn alloy-plated element wire was used.

Steel cords having the 2+7 cord structure had a minor diameter of 0.9 mm and a major diameter of 1.17, the ratio of the former to the latter being 1.3.

Using the above steel cords and a coat rubber having a 50% modulus of 30 kg/cm$^2$, 11 outermost belt layers having different thicknesses and a common end number of steel cords of 21 cords per 50 mm width were prepared.

Then, the above prepared outermost belt layers were respectively laminated with a carcass layer, a first belt layer, a second belt layer and a third belt layer of respective specifications as shown in the below Table 2, and using molds, 11 different green tires were built. Further, except for the outermost belt layers, same tire forming members or materials were used for all the tires.

According to a method commonly practiced in the art, the above prepared 11 green tires where vulcanized to provide tires of Examples 1 to 3 (of the invention), tires 1 and 2 of Prior Art Examples and tires of Comparative Examples 1 to 6, all of which had a tire size of 10000R 20 14 PR.

In connection with the above built 11 test tires, determinations of the corrosion resistance, the wire breaking resistance and the steering stability were carried out according to the below described methods. Results of the detereminations are shown also in the below Table 1.

Further, the tenacity at break and the P.L.E. of the steel cords were determined according to the method prescribed in JIS-K-3510.

CORROSION RESISTANCE AND WIRE BREAKING RESISTANCE

At intervals of 20 cm around the circumference of the tread of each test tire, holes of a depth reaching the outermost belt layer were formed in the tread by drilling, and tires were run 100,000 km on a rough road, followed then by examination of the generation of corrosion and wire break in the inner belt layer immediately inner to the outermost belt layer.

STEERING STABILITY

Each test tire was mounted on a vehicle, which was run by a test driver at a velocity of 60 km/hr, and regarding the handling followability and the return of the handle, feeling tests were conducted by the test driver.

TABLE 1

| | | Ex. 1 | C. Ex. 1 | C. Ex. 2 | C. Ex. 3 | Ex. 2 | P. Ex. 1 | P. Ex. 2 | C. Ex. 4 | Ex. 3 | C. Ex. 5 | C. Ex. 6 |
|---|---|---|---|---|---|---|---|---|---|---|---|---|
| Element Wire | | | | | | | | | | | | |
| carbon content (%) | | 0.82 | 0.72 | 0.82 | 0.82 | 0.82 | 0.72 | 0.72 | 0.82 | 0.90 | 0.82 | 0.82 |
| diameter d (mm) | | 0.30 | 0.30 | 0.25 | 0.42 | 0.38 | 0.20/0.38 | 0.22 | 0.38 | 0.38 | 0.30 | 0.30 |
| Structure and Physical Properties of Steel Cord | | | | | | | | | | | | |
| Cord Structure | | 2 + 7 | 2 + 7 | 2 + 7 | 2 + 7 | 2 + 7 | 3 × 0.20 + 6 × 0.38 | 4 × 4 | 2 + 7 | 2 + 7 | 2 + 7 | 2 + 7 |
| Twist Pitch (mm) | Inner Element Wire | 8 | 8 | 8 | 9 | 9 | 10 | — | 4 | 8 | 8 | 8 |
| | Outer Element Wire | 16 | 16 | 16 | 18 | 18 | 18 | — | 8 | 16 | 16 | 16 |
| Tenacity at Break (kgf/cord) | Found | 193 | 165 | 137 | 352 | 292 | 190 | 130 | 193 | 320 | 193 | 193 |
| | Calculated[1] | 178–215 | 178–215 | 127–153 | 335–404 | 278–335 | — | — | 178–215 | 278–335 | 178–215 | 178–215 |
| Elongation at Break (%) | | 3.4 | 2.8 | 3.3 | 3.2 | 3.2 | 2.8 | 6.8 | 3.1 | 3.3 | 3.4 | 3.4 |
| P.L.E. (%) | | 0.08 | 0.1 | 0.08 | 0.08 | 0.08 | 0.1 | 1.7 | 0.30 | 0.08 | 0.08 | 0.08 |
| ϵ/P.L.E. | | 42.5 | 28 | 41.3 | 40 | 40 | 28 | 4 | 10.3 | 41.3 | 42.5 | 42.5 |
| Coat Rubber Modulus (kg/cm$^2$) | | 30 | 30 | 30 | 30 | 30 | 30 | 30 | 30 | 30 | 30 | 30 |
| Outermost Belt Layer Thickness (mm) | Found | 2.1 | 2.1 | 2.1 | 2.4 | 2.3 | 2.1 | 2.1 | 2.1 | 2.1 | 1.4 | 2.8 |
| | Calculated[2] | 1.58–2.25 | 1.58–2.25 | 1.31–1.88 | 2.21–3.16 | 2.00–2.86 | — | — | 1.58–2.25 | 2.00–2.86 | 1.58–2.25 | 1.58–2.25 |
| Tire Performances | | | | | | | | | | | | |
| Corrosion Growth | | O | O | O | O | O | X | X | O | O | X | O |
| Wire Breaking | | O | X | X | X | O | X | X | O | O | X | O |

TABLE 1-continued

|  | Ex. 1 | C. Ex. 1 | C. Ex. 2 | C. Ex. 3 | Ex. 2 | P. Ex. 1 | P. Ex. 2 | C. Ex. 4 | Ex. 3 | C. Ex. 5 | C. Ex. 6 |
| --- | --- | --- | --- | --- | --- | --- | --- | --- | --- | --- | --- |
| Steering Stability | O | Δ | X | O | O | Δ | X | X | O | O | X |

Notes to the above Table 1:
Ex. = Example (of the present invention)
C. Ex. = Comparative Example
P. Ex. = Prior Art Example
(1) the tenactity at break F calculated according to $[1700 \cdot d^{1.872} > F > 2050 \cdot d^{2.872}]$
(2) the thickness calculated according to [minor diameter of steel cord × 1.67 ~ major diameter of steel cord × 1.79]

TABLE 2

|  | Cord Structure | End Number |
| --- | --- | --- |
| Carcass Layer | 3 + 9 + 15 × 0.175 + 1 × 0.15 | 28 |
| First Belt Layer | 3 × 0.20 + 6 × 0.38 | 18 |
| Second Belt Layer | 3 × 0.20 + 6 × 0.38 | 27 |
| Third Belt Layer | 3 × 0.20 + 6 × 0.38 | 27 |

In the above Table 2, the end number is the number of cords per 50 mm width.

From the above Table 1, it will be seen as follows.

The steel cord of the Prior Art Example 1 had the cord structure of 3+6 into which the coat rubber cannot easily permeate, so that the steel cord could not be imparted with a sufficient corrosion resistance, and the durability of the tire in this case was poor.

Similar to the above steel cord of Prior Art Example 1, the steel cord of the Prior Art Example 2 having the cord structure of 4+4 does not permit the coat rubber to easily permeate into the interior of the cord, so that the corrosion resistance of this cord was poor and the tire durability was also insufficient. Also, the strength of the belt layer was relatively low, and the impact resistance and the durability of the tire were relatively low.

The element wire used in Comparative Example 1 had a relatively small carbon content (0.72%) and the element wire used in Comparative Example 2 had a relatively small diameter d (0.25 mm), so that the tenacity at break of the steel cords in these instances was low and the toughness was limited, and it was impossible to provide sufficient impact resistance and durability to the tires.

In Comparative Example 3, the steel cord used was made of an element wire having a relatively large diameter d (0.42 mm) and had a high tenacity at break (352 kgf/cord), but the resistance to bending wear of the used element wire was relatively limited, and a wire break in the outermost belt layer occurred. The durability of the tire was insufficient.

In Comparative Example 4, the twist pitches of the steel cord were suppressed and the P.L.E. was increased, so that the rigidity of the outermost belt layer lowered and the steering stability of the tire was lowered.

In Comparative Example 5, the thickness of the outermost belt layer was suppressed, so that the function of this belt layer to protect its immediatly adjacent inner belt layer lowered and the inner belt layer did not have a sufficient corrosion resistance, whereby it was impossible to impart a sufficient durability to the tire.

In Comparative Example 6, the thickness of the outermost belt layer was made relatively great, so that this belt layer did not have a sufficient rigidity, and the steering stability of the tire lowered.

In contrast to the above, each of the tires in Examples 1, 2 and 3, which satisfied the requirements according to the present invention, had improved characteristics with respect to each of the steering stability, the impact resistance and the corrosion resistance.

What is claimed is:

1. A heavy duty pneumatic radial tire including between a tread and at least one carcass layer comprising carcass cords arranged substantially perpendicular to the circumferential direction of the tire, at least two belt layers comprising steel cords including a least a pair of belt layers disposed adjacent to each other with steel cords in one layer crossing those in the other layer, wherein an outermost belt layer disposed most closely to the tread out of all belt layers comprises a steel cord which has a cord structure of 2+7 made of an element wire having a carbon content of 0.77 to 0.92% by weight and a diameter d of 0.28 to 0.40 mm and which has a tenacity at break of $(1700 \sim 2050) d^{1.872}$ (kgf/cord) and an elongation characteristic having a ratio of an elongation at break $\epsilon$ to an initial stage elongated, $\epsilon/P.L.E.$, of at least 30, and a coat rubber having a 50% modulus of 10 to 40 kg/cm$^2$, and wherein said outermost belt layer has a thickness of at least 1.67 times the minor diameter but at greatest 1.79 times the major diameter, of said steel cord.

2. A tire as claimed in claim 1, wherein an inner element wire of said steel cord has a twist pitch of 5 to 10 mm and an outer element wire has a twist pitch of 10 to 20 mm.

3. A tire as claimed in claim 2, wherein said steel cord has a ratio of its major diameter to its minor diameter within a range of 1.1 to 1.4.

4. A tire as claimed in claim 1, wherein said steel cord comprises an element wire plated with at least one member selected from the group consisting of Cu, Sn and Zn and alloys of two or more thereof, with or without containing Ni or Co.

* * * * *